(12) United States Patent
Ackerman et al.

(10) Patent No.: US 8,955,066 B1
(45) Date of Patent: Feb. 10, 2015

(54) KNOWLEDGE BASED AUTHENTICATION USING RECENT USER INTERNET ACTIVITY

(75) Inventors: Karl Ackerman, Topsfield, MA (US); Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 244 days.

(21) Appl. No.: 13/536,191

(22) Filed: Jun. 28, 2012

(51) Int. Cl.
G06F 7/04 (2006.01)
G07F 7/04 (2006.01)

(52) U.S. Cl.
CPC .......................................... G07F 7/04 (2013.01)
USPC ............................................................. 726/5

(58) Field of Classification Search
None
See application file for complete search history.

(56) References Cited

U.S. PATENT DOCUMENTS

| | | | |
|---|---|---|---|
| 7,346,775 B2 | 3/2008 | Gasparinl et al. | |
| 7,404,087 B2 | 7/2008 | Teunen | |
| 7,502,933 B2 | 3/2009 | Jakobsson et al. | |
| 7,562,221 B2 | 7/2009 | Nystrom et al. | |
| 7,739,733 B2 | 6/2010 | Szydlo | |
| 2006/0156385 A1* | 7/2006 | Chiviendacz et al. | 726/2 |
| 2007/0124321 A1 | 5/2007 | Szydlo | |
| 2007/0244750 A1* | 10/2007 | Grannan et al. | 705/14 |

* cited by examiner

Primary Examiner — Brandon Hoffman
(74) Attorney, Agent, or Firm — Bainwood Haung (57) ABSTRACT

A technique of knowledge-based authentication receives information from third parties as to a user's recent web history including purchase history at an on-line retailer or search engine queries to produce a challenge question to authenticate the user based on that recent web history.

21 Claims, 5 Drawing Sheets

KNOWLEDGE BASED AUTHENTICATION USING RECENT USER INTERNET ACTIVITY

BACKGROUND

As individuals and businesses conduct an ever-increasing amount of activity on and over computer systems and the internet it becomes more difficult to protect the computer systems. The computer systems include proprietary and non-proprietary computer networks, and often store, archive, and transmit all types of sensitive information.

One common solution for securing computer systems is to provide login and password functionality. Passwords provide little security in that they are generally susceptible to inappropriate access, through either brute-force attacks or through phishing. Phishing is the sending of electronic communication that claims to be from some web-site in order to trick the recipient into revealing information for use in having the user reveal information such as his username and password. The user is often directed to a web-site that looks like the actual web-site in question and may silently redirect the user to the real web site after collecting their username and password or use a man-in-the-middle server.

Another solution for securing computer systems is to provide challenge questions from a knowledge-based authentication system. During a user login, the knowledge-based authentication system can query the user as to the type of car he or she owns. This information could have been provided by the user or further provided by public records such as stored by the Division of Motor Vehicles of many states. Other, questions based on public records, such as what city or state the user was the born, locations the user or relatives/associates of the user have lived in are also used.

A correct response to a challenge question allows the user access to a web-site or other data source that the user has an account with. An incorrect response has the system refrain from authenticating the user or present the user with yet another challenge question.

SUMMARY

Unfortunately, there are deficiencies with the above-described knowledge-based authentication. For example, the type of car a user owns or what city and state the user was born in are also available to third parties via public records. Further, even questions which relate to information inaccessible in public records, for example, a user's favorite color, can be found out using techniques such as phishing that are used to compromise usernames and passwords.

In contrast to the above described conventional knowledge-based authentication, an improved technique of knowledge-based authentication involves receiving information from third parties as to a user's recent web history such as purchase history at an on-line retailer or search engine queries to produce a challenge question to authenticate the user based on that recent web history.

Advantageously, the improved technique prevents a hacker or third party from finding out the challenge question as the user's on-line purchase history or search engine history is not public information. Further, phishing is curtailed as a user's on-line purchase history or search engine history changes and evolves over time, thus changing the user's response to a challenge question based on them.

One embodiment of the improved technique is directed to a method of authenticating a user via knowledge based authentication. A knowledge-based authentication system receives recent user internet history information from a portal that aggregates user internet history information. From this information, the knowledge-based authentication system forms one or more questions from the received recent user internet history information. The question or questions are then presented to the user. When the user responds, the response supplied by the user is compared to a valid response to the questions. If the comparison between the responses supplied by the user and the correct responses are true, allow the user access to the target of the authentication. Otherwise, refrain from authenticating the user.

Additionally, some embodiments of the improved technique are directed to a knowledge-based authentication server that includes a network connection and a controller circuit constructed and configured to authenticate a user. The controller circuit is constructed and configured to logically perform the method described above.

Furthermore, some embodiments of the improved technique are directed to a computer program product having a non-transitory computer readable storage medium which stores code including a set of instructions to carry the method of authenticating a user via knowledge based authentication using recent internet history information.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
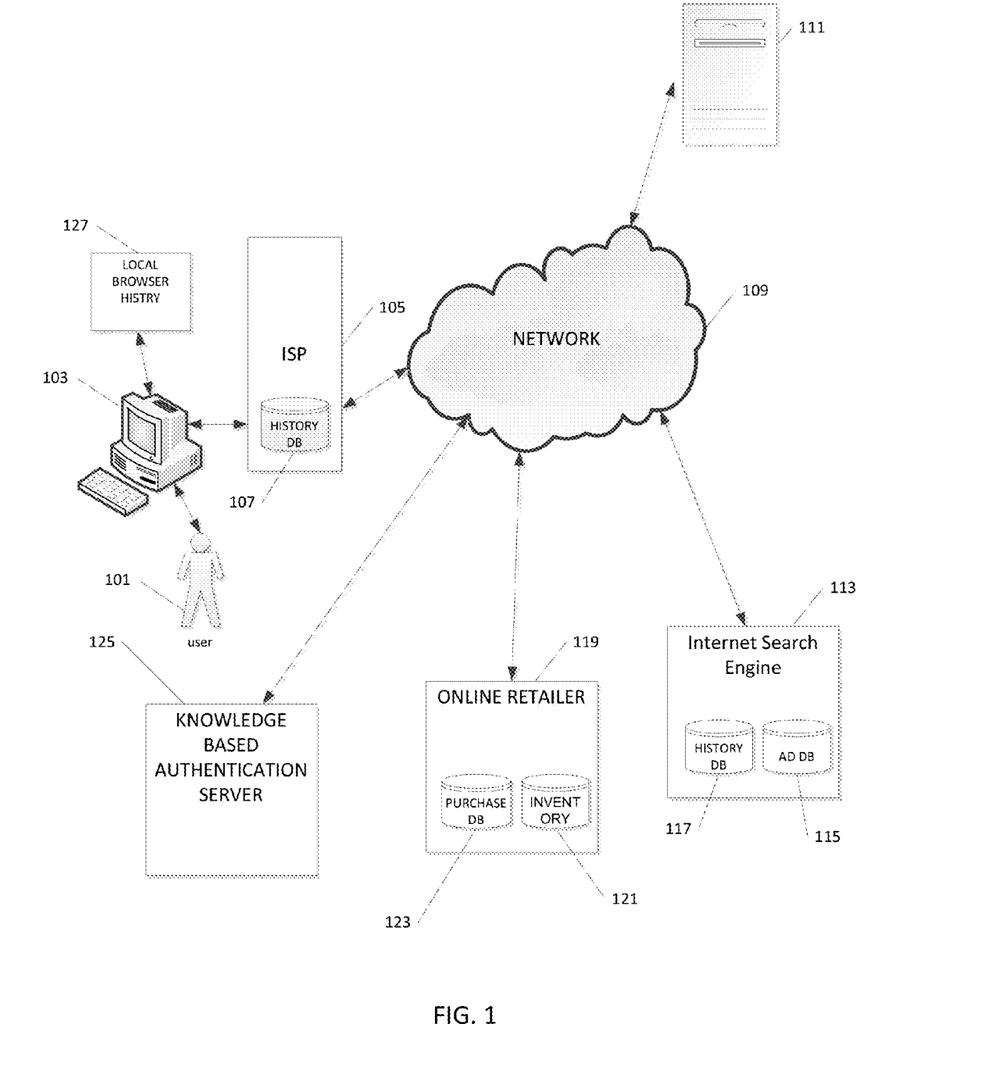
FIG. 1 is a schematic diagram overview of a knowledge based authentication system using recent internet history information.

FIG. 1 is a schematic diagram overview of a knowledge based authentication system using recent internet history information. In the system 100 a user 101 desires access to server 111. Such a server could be the server for his or her bank, health care provider, brokerage or other server that holds proprietary information that must be protected from third parties. The user accesses such a server 111 using a PC 103 to connect through a network 109, such as the internet, via his or her Internet Service Provider (ISP) 105. The internet service provider 105 records the traffic to and from PC 103 in a history database 107. The history database 107 records information such as the IP of the requesting PC 103, IP of the target server, or the URL of the target request.

Before the user 101 may access the server 111, he or she must be authenticated by the knowledge-based authentication server 125. The knowledge-based authentication server 125 provides an authentication question or questions to the user and the user's response is compared to a known good response for the authentication question or questions. The number of question or questions that need to be responded to correctly is configurable, the authentication system 100 requiring one or more correct responses to one or more questions. For example, the user has to respond to 3 of the 4 questions presented correctly to be authenticated. When the user provides the correct response to the authentication question or questions the user is authenticated and may then be granted access to the server 111.

The system further includes an online retailer portal 119 from which the user 101 has purchased retail products or services. The online retailer portal 119 includes a purchase database 123 including information about purchases including the purchases of user 101. An inventory database 121 is also included to keep track of the retailer's stock and make associations between different items of stock for purposes of suggesting other purchase that the user 101 may make.

For example, after user 101 bought a set of sheets for his bed at the online retailer portal 119, the purchase would be recorded at the purchase database 123. The user was presented with further suggestion in a web-page to purchase a comforter and pillow set.

The system further includes an internet search engine portal 113. The internet search engine 113 further includes a history database 117 of searches performed by a given user. For example, if user 101 has an account with internet search engine 113, when logged in to the internet search engine 113 portal his searches can easily be recorded in the history database 117. Such a feature has the added benefit over a local web-browser history 127 that is local to a web browser (not shown in FIG. 1) on the PC 103 in that if the user goes to an alternative device, the user 101's web history follows him or her from PC 103 to the alternative device (not shown in FIG. 1).

The internet search engine portal 113 further includes an advertisement database 115. Different internet search engines such as Google®, Yahoo® and Bing®, to name a few, make their revenue stream for placement of advertisements on a result page of an internet search or by providing programmatic interface that other web-site developers may use to develop a secondary source of advertisement revenue for the developer's website. It is understood that internet search engine portal 113 can not only provide search results, but also provides information on recent searches stored in the history database 117 and advertisements which are produced by using the information of recent searches stored in the history database 117 correlated with advertising information stored in the advertisement database 115.

It is further understood that both internet search engine portal 113 and online retailer 119 receive some of the information they use from the local browser history which in particular can contain a cookie (not shown). Cookies can contain any arbitrary information the portals 119 and 113 choose to put in them and are used to maintain state between web transactions, which are otherwise ordinarily stateless. Cookies can be used to authenticate or identify a registered user of a portal 119 and 113 without requiring them to sign in again every time they access it. At the online retailer portal 119 the cookie in the local browser history 127 is used to maintain a "shopping basket" of goods the user 101 has selected to purchase during a session at the online retailer portal 119. Cookies may also be used for site personalization, presenting different pages to different users, or tracking which pages a user has visited on a site.

The knowledge based authentication server 125 leverages the history database 107 of the ISP 105, purchase database purchase database 123 and inventory database 121 of the online retailer portal 119 and the history database 117 and advertisement database 115 of the internet search engine portal 113 to provide recent internet history information. The recent internet history information can be provided either explicitly via contractual agreement with the ISP 105, online retailer portal 119 or the internet search engine portal 113 or implicitly through the programmatic interface to provide advertisements by internet search engines. One such interface would be Google's® AdSense API. Many alternatives to Google's® AdSense API additionally exist. The programmatic interface may be called directly or imbedded in a web page, the resulting advertisement captured by the knowledge based authentication server 125.

The knowledge based authentication server 125 receives the recent internet history information from the ISP 105, online retailer portal 119 or the internet search engine portal 113, produce one or more questions based upon the recent internet history information received. For example, if the user has been searching for bird feeders a question with reference to animals could be formed. For example, "What types of animals are you interested in feeding?" The correct response would be "birds." The user could respond to the question textually or pick the correct response out of a set of responses including the correct response and several incorrect responses in text or graphically.

Once the knowledge based authentication server 125 receives the correct response or responses the user is authenticated and allowed access to server 111. If however, the user enters or picks an incorrect response, for example, "dog", the knowledge based authentication server 125 does not verify the authenticity of the user and the system denies access to the server 111. The knowledge based authentication server 125 may attempt to retrieve recent internet history information about another recent search and produce one or more additional questions again. If the user again enters an incorrect response or responses, another question or questions may be generated or the user locked out of the system depending on the security requirements of the server 111.

Further, where the user 101 is challenged with a set of questions, for example, four, the knowledge based authentication server 125 will authenticate the user 101 when her or she correctly responds to three questions. The passing percentage is predefined to be 75%. However, this percentage is configurable depending on the needs of each entity using the services of the knowledge based authentication server 125.

Figure 2:
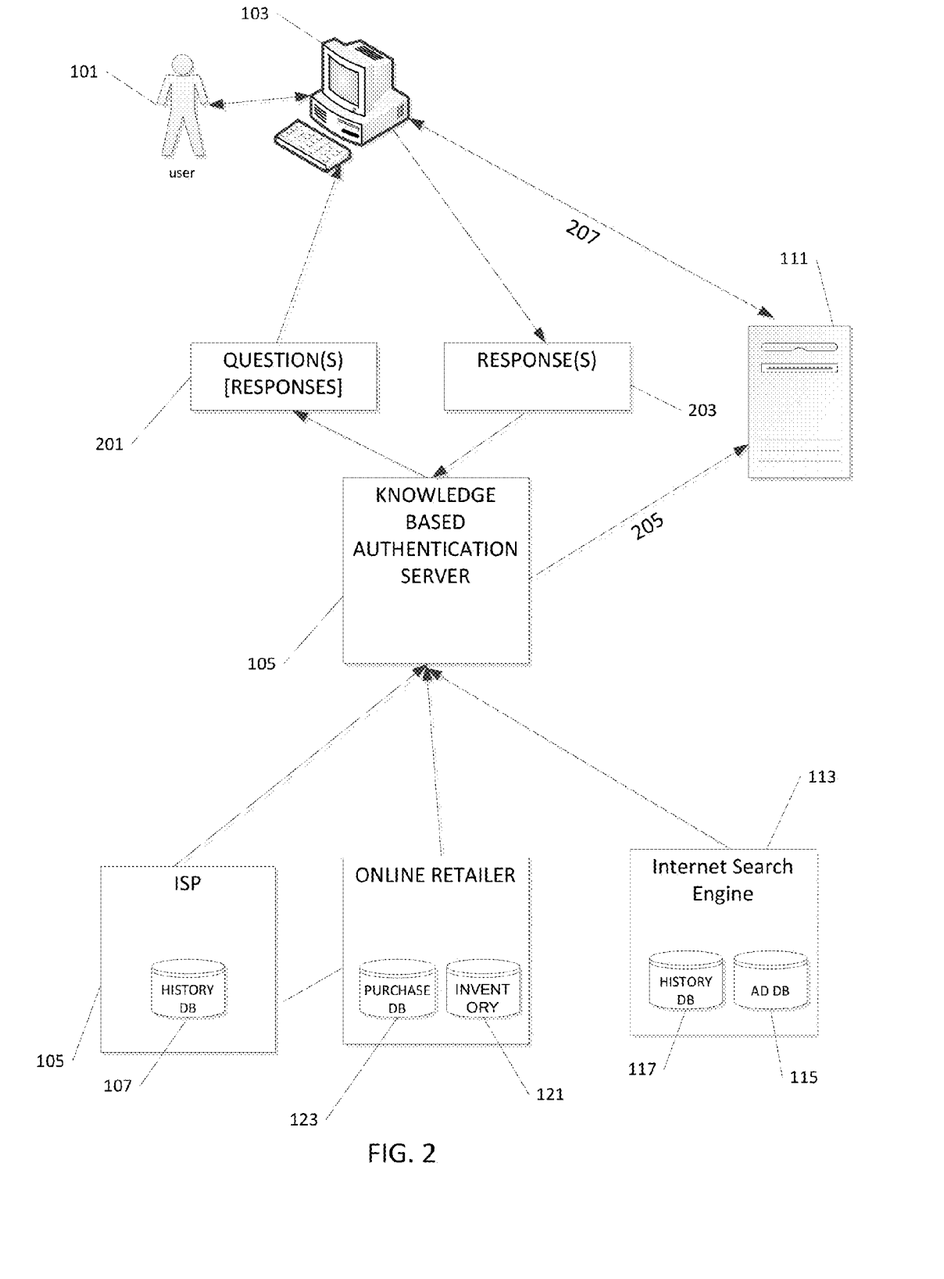
FIG. 2 is a schematic diagram of the flow of data through knowledge-based authentication system.

FIG. 2 is a schematic diagram of the flow of data through knowledge-based authentication system 100. When the user 101 wishes to access the server 111, her or she initiates, for example, a web session that attempts to login to a web service provided by the server 111. The server 111 requests that the knowledge based authentication server 125 provide the user 101 with a challenge question or questions. For example, if the user has been looking at or purchased eReaders and tablets but not laptops the knowledge based authentication server 125 could produce three questions: two valid about eReaders and Tablets and one invalid question about laptops. The knowledge based authentication server 125 receives from ISP 105, online retailer portal 119 or the internet search engine portal 113 recent internet history information. From the recent internet history information the knowledge based authentication server 125 produces one or more questions 201 based on the recent internet history information. Alternatively, the one or more challenge questions 201 may include a set of responses including at least one correct response for each question and a set of incorrect responses for each question. The set of incorrect responses must be a set of responses that the user would know are incorrect in the context of the question. The user 101 upon receiving the question on his or her web browser on the PC 103 provides a response 203 which is transmitted back to the knowledge based authentication server 125 where the response 203 is examined. If the response 203 is the correct response then the knowledge based authentication server 125 instructs 205 the Server 111 to grant the user 101 access 207.

Figure 3:
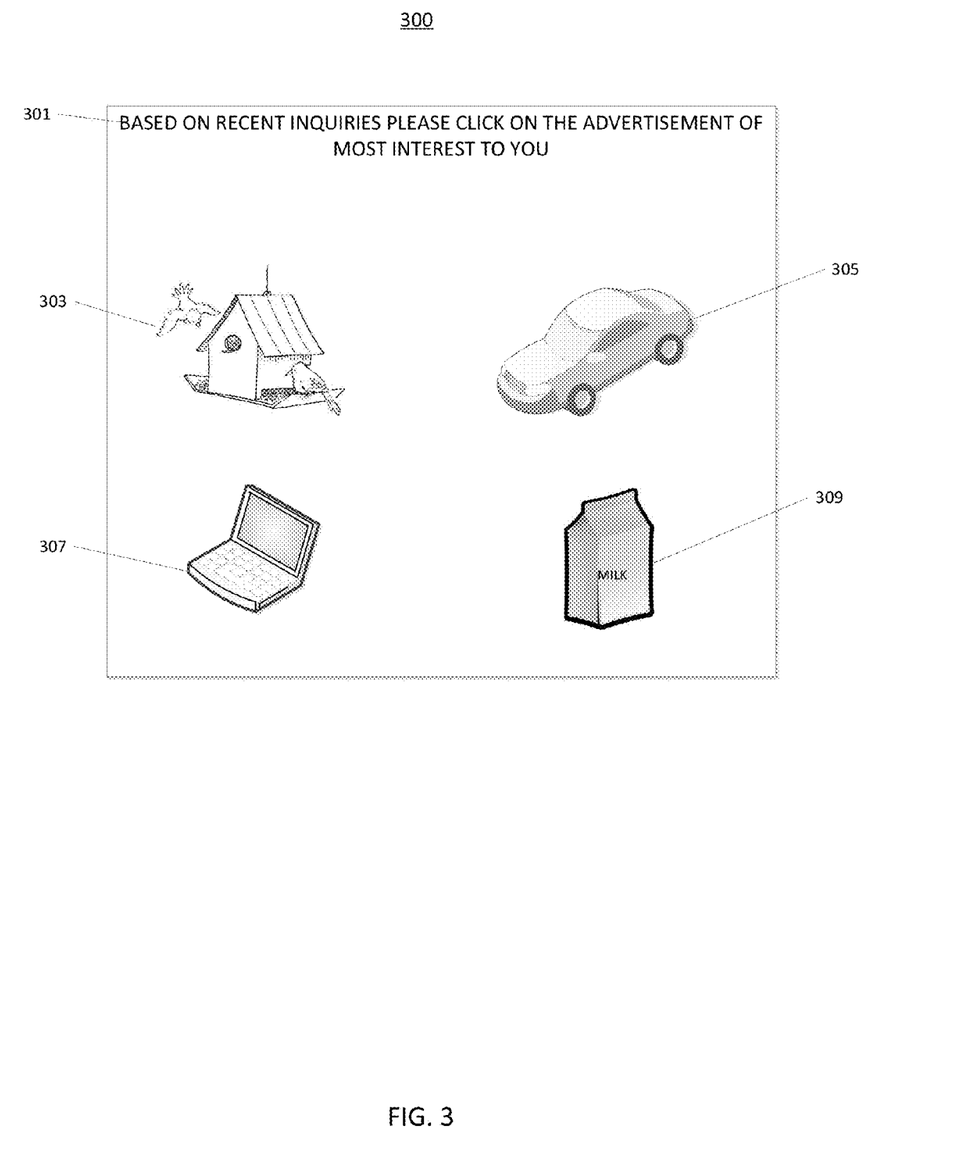
FIG. 3 is a rendering of an example authentication screen providing the user with advertising information on which to base authentication.

FIG. 3 is a rendering of an authentication screen 300 providing the user with advertising information on which to base authentication. In the example above, the user 101 had been searching for bird feeders at the internet search engine portal 113. The internet search engine portal 113 when producing advertising information can base the advertisement on information about a current web page in the user's browser on the PC 103. In this case, if the web page was for entry into a banking site, the internet search engine portal 113 may provide advertisement information about banks, credit cards, or other financial services. Instead programmatically a call to the internet search engine portal 113 for advertising information uses parameters indicating that advertisement should be based on recent internet searches.

Based on the recent internet history information, an advertisement for a bird feeder is displayed as a correct response 303. The window 300 also includes a set of three incorrect responses, an advertisement for a car 305, a laptop computer 307 and milk 309. An inquiry 301 asks the user 101 to click on the advertisement that her or she is most interested in.

Figure 4:
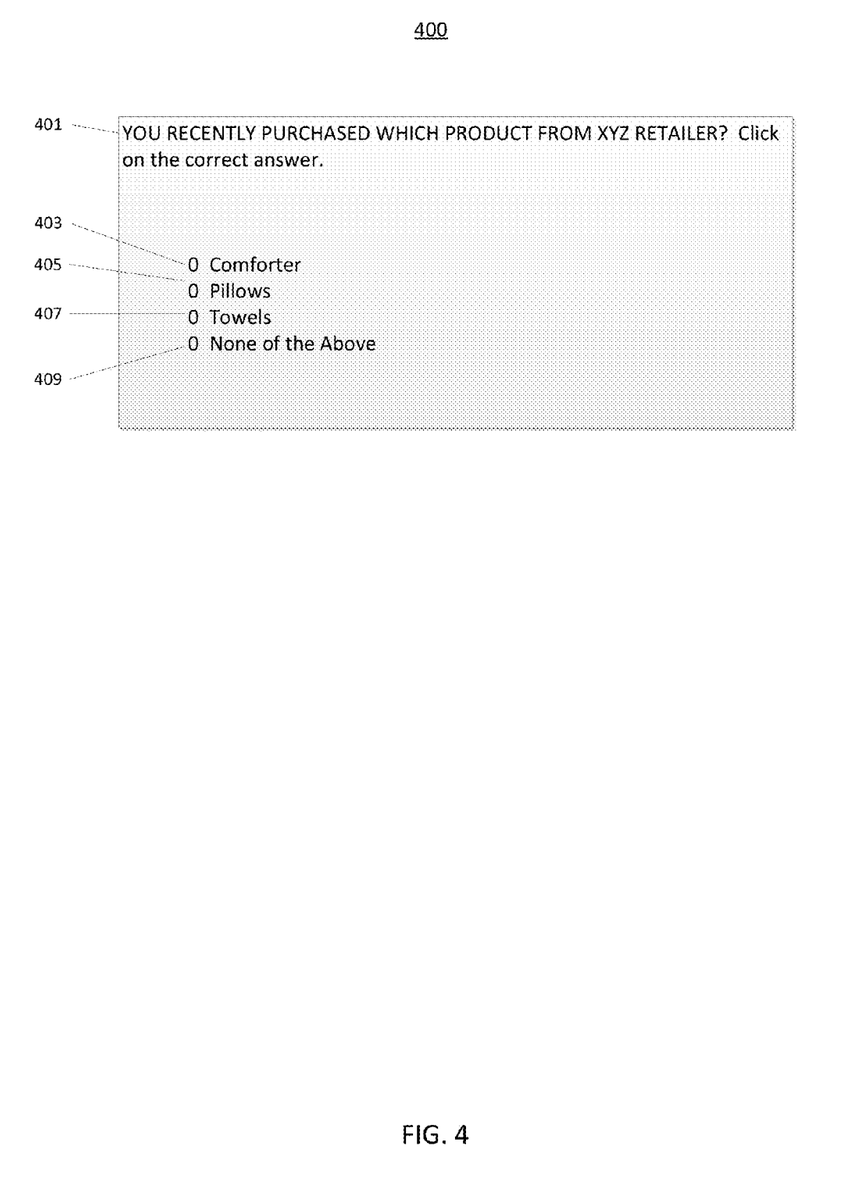
FIG. 4 is a rendering of an example window authenticating a user based on a recent purchase at an online retailer.

FIG. 4 is a rendering of a window 400 authenticating a user based on a recent purchase at an online retailer. Suppose that, the user 101 recently bought sheets and did not buy comforter, pillow and towels. At the online retailer portal 119 the history of this purchase is stored in the purchase database 123. By prior agreement, the knowledge based authentication server 125 has access to this recent internet history information. The knowledge based authentication server 125 forms a question about products that the user 101 has recently purchased. In this example however, the correct response is "None of the above" 409. As such, the question is a trick question in that the knowledge based authentication server 125 excludes the correct response, "sheets" from the set of responses. The incorrect responses are those of similar nature (i.e. context specific), but can be eliminated as correct responses as the knowledge based authentication server 125 has access to the purchase database 123 at the online retailer portal 119. Therefore, the incorrect responses comforter 403, pillow 405 and towels 407, all contextually specific items to towels, can be eliminated as recent purchases. The sheets purchased by user 101 are found, in the Bed & Bath department of the online retailer portal 119, therefore it would be understood that comforter, pillow and towels are context specific as they come from the same department.

It should be understood that on-line retailers such as online retailer portal 119 may have originally been a traditional brick and mortar store. When the user 101 makes a purchase form the brick and mortar store using an account or having a credit card associated with the account, the purchase will also be stored in the purchase database 123.

Figure 5:
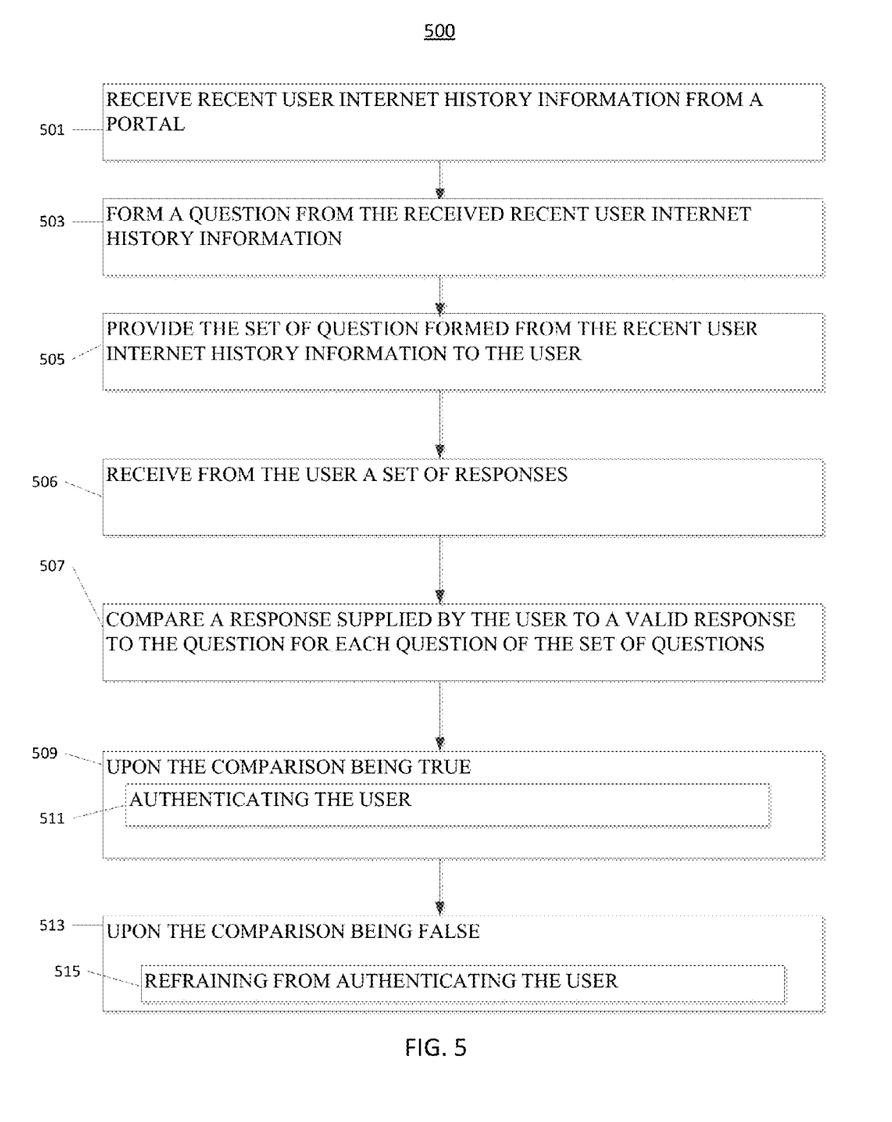
FIG. 5 is a flow chart of a method of authenticating a user via knowledge based authentication.

FIG. 5 is a flow chart of a method 500 of authenticating a user 101 via knowledge based authentication. At step 501, the knowledge based authentication server 125 receives recent user internet history information from a portal. The portal aggregating user internet history aggregates information such as internet searches, internet purchases and web sites visited. Once this information is received at knowledge based authentication server 125, at step 503, form a question from the received recent user internet history information. At step 505, the knowledge based authentication server 125 provides the question formed from the recent user internet history information to the user. At step 506, compare a response supplied by the user to a valid response to the question. Alternatively, the knowledge based authentication server 125 could also provide a set of responses (303, 305, 307, 309; or 403, 405, 407, and 409) including at least one correct response (303 or 409). Once, the response from the user 101 is received, at step 507, compare the response supplied by the user 101 to the valid response to the question. If (509) the response supplied by the user 101 is equal to the valid response (303 or 409), then authenticate the user 101 granting access to the server 511. Otherwise (513), at step 515, refrain authenticating the user 101. It is understood that while the method speaks of a question, it could also be a set of questions.

While various embodiments of the present disclosure have been particularly shown and described, it will be understood by those skilled in the art that various changes in form and details may be made therein without departing from the spirit and scope of the present disclosure as defined by the appended claims.

For example, FIG. 1 describes a knowledge-based authentication system 125. It would be understood that the knowledge-based authentication system 125 includes a controller circuitry for performing the logic of the method claim could likewise execute a program stored on a persistent storage device, such as a disk drive, by a microprocessor to perform the method steps discussed above.

Further, while the description herein refers to the server 111 and knowledge-based authentication server 125 as separate entities, it is understood that server 111 could further include the functionality of the server knowledge-based authentication server 125. Additionally, the knowledge-based authentication server 125 could include storage to store recent user internet history information received from other sources or cookies of the local browser history 127.

Further, the types of aggregators from which the knowledge-based authentication server receives recent user internet history information may be 1.) direct via a license with the aggregator of recent user internet history information; 2) indirect from analysis of advertisements produced by the aggregator; and 3) from recent user internet history information gathered and stored by the knowledge-based authentication server 125.

Additionally, the knowledge based authentication server 125 can also be deployed to protect the on-line retailer server 119 and mine the purchase database 123, ISP 105, or the internet search engine 113. In each of these scenarios, the user 101 may have forgotten their password and knowledge based authentication based on recent internet history information stored by the on-line retailer server 119 can be used for access. Alternately, the knowledge based authentication system 100 could replace a password as the primary authentication method for the user 101.

Social media web sites are also aggregators of recent internet history information. Information about the user 101 or information common to a group of users in the social media site to which the user is a member will be used as recent internet history information.

What is claimed is:

1. A method of authenticating a user via knowledge based authentication, the method comprising:
   receiving, via a controller circuit, recent user internet history information from a portal, the portal aggregating user internet history information;
   forming, via the controller circuit, a set of questions, the set of questions including at least one question, the set of questions formed from the received recent user internet history information;

providing, via the controller circuit, the set of questions formed from the recent user internet history information to the user;

receiving, via the controller circuit, a set of responses to the set of questions from the user, the set of responses including at least one response;

comparing, via the controller circuit, each response of the set of responses to a valid response for each corresponding question of the set of questions, upon the comparison being true, authenticating the user; and upon the comparison being false, refraining from authenticating the user; wherein receiving the recent user internet history information from the portal includes acquiring, as at least part of the recent user internet history, an aggregation of facts describing past web-based browsing activity of the user; and wherein forming the set of questions includes generating a set of knowledge-based authentication (KBA) questions based on the aggregation of facts to challenge the user's memory of the past web-based browsing activity;

wherein providing the set of questions formed from the recent user internet history information to the user includes prompting the user to read the set of KBA questions; and wherein receiving the set of responses to the set of questions from the user includes obtaining answers to the set of KBA questions from the user.

2. The method of claim 1, further includes:
providing with each question of the set of questions, a set of proposed responses, each of the set of proposed responses including at least the valid response to the corresponding question.

3. The method of claim 2, further includes:
excluding as the valid response of each question of the set of questions, information found in the recent user internet history information.

4. The method of claim 2, further including:
adding to the set of proposed responses, a set of invalid responses, the set of invalid response being context specific to the recent user internet history information.

5. The method of claim 4, wherein the comparison is true when a predefined percentage of responses to the set of questions are responded to correctly.

6. The method of claim 1, wherein the portal aggregates information of at least one of 1) the user's purchase history of products; 2) the user's inquiries as to products; 3) the user's page visit history; and 4) information common to a group of users, the user belonging to the group of users.

7. The method of claim 1, wherein recent user internet history information is an advertisement directed towards the user, the advertisement formed at the portal from information stored in the portal.

8. The method of claim 1, wherein the set of questions includes at least one context specific trick question.

9. A method as in claim 1, prompting the user to read the set of KBA questions includes providing the user with multiple KBA questions;

wherein obtaining the answers to the set of KBA questions includes acquiring multiple answers from the user;

wherein the comparison is deemed to be true when the user answers a predefined percentage of the multiple KBA questions correctly; and wherein the comparison is deemed to be false when the user does not answer the predefined percentage of the multiple KBA questions correctly.

10. A knowledge based authentication system, the system comprising:

a network connection;

a controller circuit constructed and configured to authenticate a user, the controller circuit configured to:

receive via the network connection, recent user internet history information from a portal, the portal aggregating user internet history information;

form a set of questions, the set of questions including at least one question, the set of questions formed from the received recent user internet history information;

provide to the user via the network connection, the set of questions formed from the recent user internet history information to the user;

receive from the user a set of responses to the set of questions, the set of responses including at least one response;

compare each response of the set of responses to a valid response for each corresponding question of the set of questions, and upon the comparison being true, authenticate the user; and upon the comparison being false, refrain from authenticating the user; wherein receiving the recent user internet history information from the portal includes acquiring, as at least part of the recent user internet history, an aggregation of facts describing past web-based browsing activity of the user; and wherein forming the set of questions includes generating a set of knowledge-based authentication (KBA) questions based on the aggregation of facts to challenge the user's memory of the past web-based browsing activity;

wherein providing to the user the set of questions formed from the recent user internet history information includes prompting the user to read the set of KBA questions; and wherein receiving from the user the set of responses to the set of questions includes obtaining answers to the set of KBA questions from the user.

11. The system of claim 10, the controller circuit further configured to:

provide with each question of the set of questions, a set of proposed responses, each of the set of proposed responses including at least the valid response to the corresponding question.

12. The system of claim 11, the controller circuit further configured to:

exclude as the valid response of each question of the set of questions, information found in the recent user internet history information.

13. The system of claim 11, the controller circuit further configured to:

adding to the set of proposed responses a set of invalid responses, set of invalid responses is context specific to the recent user internet history information.

14. The system of claim 13, wherein the comparison is true when a predefined percentage of responses to the set of questions are responded to correctly.

15. The system of claim 10, wherein the portal aggregates information of at least one of 1) the user's purchase history of products; 2) the user's inquiries as to products; 3) the user's page visit history; and 4) information common to a group of users, the user belonging to the group of users.

16. The system of claim 10, wherein recent user internet history information is an advertisement directed towards the user, the advertisement formed at the portal from information stored in the portal.

17. A non-transitory computer readable storage medium storing thereon a computer program, the computer program executed by a processor to perform the method of authenticating a user via knowledge based authentication, the method comprising:

receiving recent user internet history information from a portal, the portal aggregating user internet history information;

forming a set of questions, the set of questions including at least one question, the set of questions formed from the received recent user internet history information;

providing the set of questions formed from the recent user internet history information to the user receiving from the user a set of responses to the set of questions, the set of responses including at least one response comparing each response of the set of responses to a valid response for each corresponding question of the set of questions, and upon the comparison being true, authenticating the user; and upon the comparison being false, refraining from authenticating the user; wherein receiving the recent user internet history information from the portal includes acquiring, as at least part of the recent user internet history, an aggregation of facts describing past web-based browsing activity of the user; and wherein forming the set of questions includes generating a set of knowledge-based authentication (KBA) questions based on the aggregation of facts to challenge the user's memory of the past web-based browsing activity;

wherein providing the set of questions formed from the recent user internet history information to the user includes prompting the user to read the set of KBA questions; and wherein receiving from the user the set of responses to the set of questions includes obtaining answers to the set of KBA questions from the user.

18. The non-transitory computer readable storage medium of claim 17, further includes:

providing with each question of the set of questions, a set of proposed responses, each of the set of proposed responses including at least the valid response to the corresponding question.

19. The non-transitory computer readable storage medium of claim 18, further includes:

excluding as the valid response of each question of the set of questions, information found in the recent user internet history information.

20. The non-transitory computer readable storage medium of claim 18, further including:

adding to the set of proposed responses, a set of invalid responses, the set of invalid responses is context specific to the recent user internet history information.

21. The non-transitory computer readable storage medium of claim 20, wherein the comparison is true when a predefined percentage of responses to the set of questions are responded to correctly.

\* \* \* \* \*